United States Patent
Phillips et al.

(10) Patent No.: US 11,085,713 B2
(45) Date of Patent: Aug. 10, 2021

(54) HEAT EXCHANGER

(71) Applicant: HS Marston Aerospace Limited, Wolverhampton (GB)

(72) Inventors: Paul Phillips, Bromsgrove (GB); Berwyn Pollard, Wolverhampton (GB)

(73) Assignee: HS MARSTON AEROSPACE LIMITED, Wolverhampton (GB)

( * ) Notice: Subject to any disclaimer, the term of this patent is extended or adjusted under 35 U.S.C. 154(b) by 0 days.

(21) Appl. No.: 16/030,917

(22) Filed: Jul. 10, 2018

(65) Prior Publication Data
US 2019/0011202 A1 Jan. 10, 2019

(30) Foreign Application Priority Data
Jul. 10, 2017 (EP) ..................................... 17180588

(51) Int. Cl.
F28F 27/02 (2006.01)
B64D 37/32 (2006.01)
F28D 9/00 (2006.01)
F28D 21/00 (2006.01)

(52) U.S. Cl.
CPC ............... *F28F 27/02* (2013.01); *B64D 37/32* (2013.01); *F28D 9/0093* (2013.01); *F28D 2021/0021* (2013.01)

(58) Field of Classification Search
CPC .............. F28F 27/02; F28D 9/0093; F28D 2021/0021; B64D 37/32
See application file for complete search history.

(56) References Cited

U.S. PATENT DOCUMENTS

| | | | |
|---|---|---|---|
| 3,487,642 A | 1/1970 | Norton | |
| 3,847,298 A * | 11/1974 | Hamilton | B60K 15/03 220/88.3 |
| 4,798,242 A * | 1/1989 | Kito | F28F 27/02 165/101 |
| 7,694,916 B2 | 4/2010 | Limaye et al. | |
| 8,602,362 B2 | 12/2013 | Buchwald | |
| 2007/0054610 A1* | 3/2007 | Jensen | B64D 37/32 454/74 |
| 2014/0231059 A1 | 8/2014 | Nietupski et al. | |
| 2015/0260458 A1 | 9/2015 | Goel et al. | |
| 2015/0300744 A1 | 10/2015 | Goel et al. | |
| 2016/0305719 A1 | 10/2016 | Landre | |

FOREIGN PATENT DOCUMENTS

| | | |
|---|---|---|
| EP | 2439141 A2 | 4/2012 |
| FR | 2903768 A1 | 1/2008 |

OTHER PUBLICATIONS

Extended European Search Report for International Application No. 17180588.0 dated Jan. 22, 2018, 7 pages.

* cited by examiner

*Primary Examiner* — Jon T. Schermerhorn, Jr.
(74) *Attorney, Agent, or Firm* — Cantor Colburn LLP

(57) ABSTRACT

There is provided a fuel tank inerting system for an aircraft. The system comprises: a catalytic heat exchanger comprising a first flow path and a second flow path for heat exchange with the first flow path, wherein the first flow path comprises a plurality of core flow paths each fluidly isolated from one another within the catalytic heat exchanger and each arranged to exchange heat with the second flow path; and a control valve arranged upstream of the first flow path of the catalytic heat exchanger and arranged to selectively control a flow to each of the core flow paths.

10 Claims, 1 Drawing Sheet

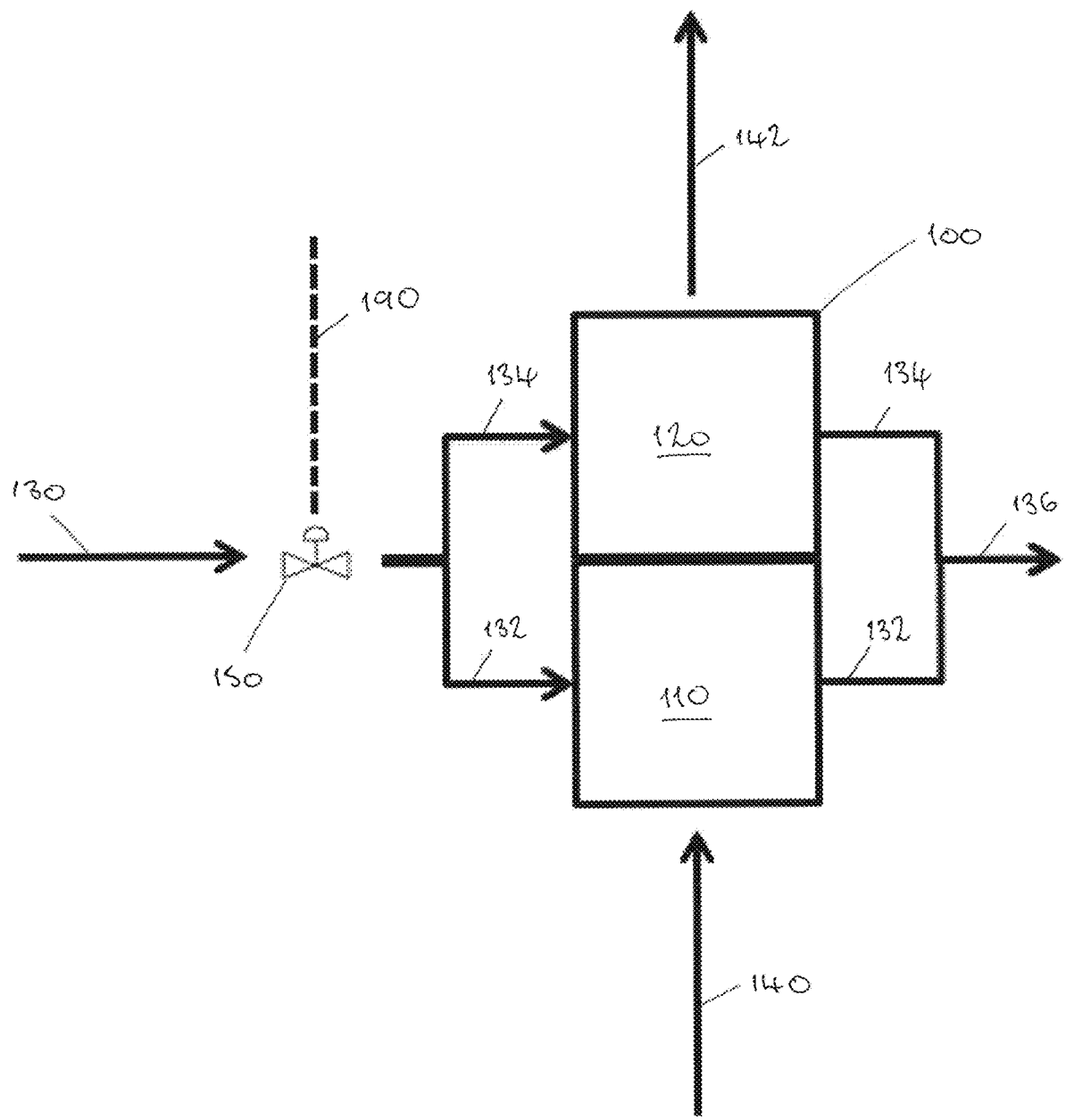

HEAT EXCHANGER

FOREIGN PRIORITY

This application claim priority to European Patent Application No. 17180588.0 filed Jul. 10, 2017, the entire contents of which is incorporated herein by reference.

TECHNICAL FIELD

The invention relates to a fuel tank inerting system for an aircraft, particularly a fuel tank inerting system comprising a catalytic heat exchanger.

BACKGROUND

Fuel tank inerting systems (also called flammability reduction systems) are used on most commercial aircraft. They are used to provide an inert atmosphere to the ullage or header of a fuel tank in order to reduce the risk of fuel combustion and explosion.

Typically they employ air separation membrane technology. However, such known systems degrade over time and require significant levels of costly maintenance. An alternative system is a catalyst based fuel tank inerting system, where bleed-air-fed air separation modules and filter elements are replaced by a catalyst. Such a system requires fuel vapour to be mixed with oxygen and passed through a catalyst device to be converted into carbon dioxide ($CO_2$) and water ($H_2O$). Due to significant temperatures that are generated during the catalyst's exothermic reaction the catalyst needs to be cooled. Hence the catalyst may be provided as a coating inside a heat exchanger. The heat exchanger may be cooled by e.g. ram air.

However, in use such heat exchangers face issues because different amounts of cooling are available during different stages of flight. For example, operating conditions on the ground are different to those at cruise. Ram air at cruise can have a temperature of −40° F. (−40° C.), whereas on the ground in hot climates it can have a temperature as much as +130° F. (50° C.). The catalysed reaction of fuel and oxygen in the heat exchanger must be kept at a minimum of 350° F. (180° C.) in order to keep the catalyst 'lit' (i.e. reacting) and the catalysed reaction active. A heat exchanger sized so that it achieves a maximum temperature of 425° F. (220° C.) on the ground will produce warmed ram air of 1600° F. (870° C.) during cruise, far in excess of the necessary temperatures. Making a heat exchanger small in order to avoid such high cruise temperatures results in too high ground temperatures. Thus, it is necessary to compromise and use a heat exchanger that is non-optimal for all conditions.

SUMMARY

According to a first aspect of the present invention there is provided a fuel tank inerting system for an aircraft, the system comprising: a catalytic heat exchanger comprising a first flow path and a second flow path for heat exchange with the first flow path, wherein the first flow path comprises a plurality of core flow paths each fluidly isolated from one another within the catalytic heat exchanger and each arranged to exchange heat with the second flow path; and a control valve arranged upstream of the first flow path of the catalytic heat exchanger and arranged to selectively control a flow to each of the core flow paths.

The control valve may control a flow of cooling medium to the core flow paths for cooling a catalytic reaction in the second flow path. Alternatively, the control valve may control a flow of fuel vapour and oxygen to the core flow paths for sustaining catalysed reactions therein.

The plurality of core flow paths make up at least a portion of the first flow path, and may make up the whole of the first flow path. The core flow paths are arranged in parallel through the catalytic heat exchanger, in that they all originate at a (first) same point and culminate at a (second) same point. Each core flow path may comprise multiple smaller flow paths. In use, each core flow path may contain a catalytic reaction fluidly isolated from those in the other core flow paths. The control valve is then used to control which of the core flow paths receive a flow e.g. of fuel and oxygen. The control valve may be arranged to provide flow to any and all of the core flow paths or none, and hence may control the capacity of the catalytic heat exchanger as a whole. If only one core flow path is provided with a flow, the capacity of the heat exchanger will be lower than if all the core flow paths are provided with flow. Hence, by controlling the flow of fuel to the core flow paths, the control valve may control the rate of the catalytic reaction as a whole.

The catalytic heat exchanger may comprise a plurality of distinct cores and each core may define one of the plurality of core flow paths of the first flow path. Each core may define only one of the plurality of core flow paths. Each core may be in heat exchange with the second flow path. The catalytic heat exchanger may therefore be partitioned into distinct portions (i.e. cores), each of which may operate as a heat exchanger in its own right, and each of which may be fluidly isolated from the others within the catalytic heat exchanger.

Each of the plurality of distinct cores may have the same cooling capacity (i.e. performance capability), such that the capacity of the heat exchanger may increase linearly with the use of each additional core (at least theoretically). When two cores receive flow from the control valve, the catalytic heat exchanger may have twice the capacity of a single core. When three cores receive flow, the heat exchanger may have three times the capacity of a single core, and so on.

Each of the plurality of distinct cores may have a different cooling capacity. For example, a second core may have twice the capacity of the first, and a third core may have twice the capacity of the second. Then, use of the three cores would have seven times the capacity of the first core alone. In this way, different capacity levels may be achieved by directing flow to different combinations of cores. For example, a capacity twice that of the first core may be achieved by using only the second core. A capacity three times that of the first core may be achieved by using the first and second cores. A capacity four times that of the first core may be achieved by using only the third core. A capacity five times that of the first core may be achieved by using the first and third cores, and so on. The multi-core catalytic heat exchanger may therefore provide a wide range of capacities depending on how the control valve is controlled to provide flow to the relevant cores.

The second flow path may first encounter (i.e. come into heat exchange with) the core with the greatest capacity. The second flow path may next encounter the core (and hence the core flow path) with the next highest cooling capacity. The second flow path may encounter the core with the lowest cooling capacity last. In this manner, the core with the greatest need of cooling may be in heat exchange with a flow of cooling medium in the second flow path when that cooling medium is at its coolest. Other cores may encounter (i.e. be in heat exchange with) the second flow path once the cooling medium therein has already been partially heated by cooling the largest core.

The second flow path may encounter each of the core flow paths sequentially. Hence the second flow path may encounter each of the core flow paths in sequence. The second flow path may immediately encounter a second core flow path upon leaving a first, so that the cooling medium passes straight from one core to another.

The control valve may be operable to prevent flow to each and all of the core flow paths. That is, the control valve may completely prevent flow to any and all of the core flow paths so that flow thereto is stopped, and may prevent flow to each core flow path independently of the flow to the others. In this way, flow may be provided only to any and all of the core flow paths as needed for a given operating condition.

The control valve may be an electromechanical servo valve, and may hence be used to provide precise adaptive control of the catalyst cooling process as required. The control valve may be a binary on/off valve that is triggered via a suitable signal and may be electrical, pneumatic, or hydraulic. The control valve may be controlled in any suitable manner.

According to a second aspect of the present invention there is provided a method of controlling a catalytic heat exchanger of a fuel inerting system, the catalytic heat exchanger comprising a first flow path and a second flow path for heat exchange with the first flow path, wherein the first flow path comprises a plurality of core flow paths each fluidly isolated from one another within the catalytic heat exchanger and each arranged to exchange heat with the second flow path; the method comprising controlling flow to the each of the core flow paths to change capacity of the catalytic heat exchanger.

The flow to any and all of the core flow paths may therefore be controlled and accordingly may provide control over the catalytic reaction in the catalytic heat exchanger and the cooling thereof. The method may therefore be used to tailor the requirements of the catalytic heat exchanger as needed throughout different operating conditions.

The method may comprise preventing flow to a core flow path to reduce heat exchanger capacity. The method may comprise starting flow to a core flow path to increase heat exchanger capacity. The method may comprise using the heat exchanger during flight and reducing capacity of the heat exchanger during cruise.

The method may comprise reducing the rate of generation of $CO_2$ and $H_2O$ by reducing the capacity of the heat exchanger. Hence, the method may comprise controlling the atmosphere in an ullage of a fuel tank in response to flight conditions.

The method may comprise preventing flow to a core flow path in response to a reduced demand for inert gas, and/or may comprise starting flow to a core flow path in response to an increased demand for inert gas. The method may comprise controlling flow of fuel and oxygen so that it is provided to only those cores necessary to meet demand for inert gas. The demand for inert gas may vary during different stages of use of the system (e.g. different stages of flight), and hence the method may comprise controlling the control valve in response to the demand for inert gas.

The method may comprise using a system as described above in relation to the first aspect.

BRIEF DESCRIPTION OF THE DRAWINGS

Exemplary embodiments of the invention will now be described by way of example only and with reference to the accompanying FIGURE, in which:

FIG. 1 shows a catalytic heat exchanger for use with a fuel inerting system for an aircraft.

DETAILED DESCRIPTION

FIG. 1 show a multi-core catalytic heat exchanger 100 comprising a first core 110 and a second core 120. Fuel vapour and oxygen flows along line 130 to a control valve 150. The control valve is operated by a control (not shown) via a control line 190. The control valve 150 is operable to control the flow of fuel vapour and oxygen in core flow paths 132 and 134. The control valve 150 may permit flow only to the first core flow path 132 to pass through the first core 110. The control valve may permit flow only to the second core flow path 134 to pass through the second core 120. Alternatively the control valve 150 may permit flow of fuel vapour and oxygen to both the first core 110 and the second core 120, or may stop flow altogether. Further, the control valve 150 may control the rate of flow to each of the core flow paths 132 and 134.

A first flow path passes through the catalytic heat exchanger 100 from left to right and comprises core flow paths 132 and 134. A second flow path from line 140 passes through the catalytic heat exchanger 100 to line 142. The second flow path carries a cooling medium, in this case cool ram air, for cooling the catalytic reactions in the first core 110 and second core 120. The line 142 thus carries warmed ram air.

Flow from the core flow paths 132 and 134 leaving the catalytic heat exchanger 100 recombines in line 136. Line 136 thus carries carbon dioxide ($CO_2$) and water ($H_2O$) which are the products of the catalytic reaction in the heat exchanger 100. The water is separated out of the flow by a separator (not shown) and the inert carbon dioxide is supplied to the ullage of an aircraft fuel tank to generate an inert environment therein.

Ram air supplied to the heat exchanger 100 through line 140 at high altitude is substantially colder than ram air supplied near ground level. Therefore, it will provide greater cooling and a smaller heat exchanger is required. In this case, the control valve 150 will prevent flow of fuel and oxygen to second core 120 since the first core has sufficient capacity.

At lower altitudes the ram air is warmer and hence cooling of the reaction thereby is less efficient. In this case, the control valve 150 is controlled to stop the flow of fuel vapour and oxygen first core 110 and start the flow to the second core 120. In this embodiment, the second core 120 has twice the cooling capacity of the first core 110 and hence the heat exchanger 100 will operate at twice the capacity. If further cooling capacity is needed, the control valve 150 will start flow to the first core 110 in addition to the second core 120.

The demand for inert gas may also vary at different stages of flight, and hence inert gas will need to be generated at a different rate via the catalytic reaction. The need for cooling of the reaction will change correspondingly with the demand for inert gas, and the control valve 150 can control flow of fuel and oxygen to the cores 110 and 120 of the heat exchanger 100 as needed. If less inert gas is needed, the control valve 150 may direct flow only to the first core 110. If demand for inert gas increases the control valve can direct flow of fuel and oxygen to both the first core 110 and the second core 120, and so on.

The system may therefore be used to control the rate of the reaction, as well as the requisite cooling, as needed in response to changes in the cooling available and/or to changes in the demand for inert gas.

It will therefore be appreciated that the heat exchanger can reduce fuel consumption by reducing the use of fuel in the fuel inerting system when possible.

The invention claimed is:

1. A fuel tank inerting system for an aircraft, the system comprising:
   a catalytic heat exchanger arranged upstream of a fuel tank to generate an inert environment in an ullage of the fuel tank, the catalytic heat exchanger comprising a first flow path and a second flow path for heat exchange with the first flow path, wherein the first flow path comprises a plurality of core flow paths each containing a catalyst and fluidly isolated from one another within the catalytic heat exchanger and each arranged to exchange heat with the second flow path; and
   a control valve arranged upstream of the first flow path of the catalytic heat exchanger and arranged to selectively control a flow to each of the core flow paths;
   wherein the plurality of core flow paths are arranged in parallel through the catalytic heat exchanger;
   wherein the catalytic heat exchanger comprises a plurality of distinct cores and each core defines one of the plurality of core flow paths of the first flow path;
   wherein each of the plurality of distinct cores has a different cooling capacity; and
   wherein a second core of the plurality of cores has twice the cooling capacity of a first core of the plurality of cores.

2. A system as claimed in claim 1, wherein the second flow path first encounters the core with the greatest capacity.

3. A system as claimed in claim 1, wherein the second flow path encounters each core flow path sequentially.

4. A system as claimed in claim 1, wherein the control valve is an electromechanical servo valve.

5. A method of controlling a catalytic heat exchanger of a fuel inerting system, the catalytic heat exchanger arranged upstream of a fuel tank to generate an inert environment in an ullage of the fuel tank, the catalytic heat exchanger comprising a first flow path and a second flow path for heat exchange with the first flow path, wherein the first flow path comprises a plurality of core flow paths each containing a catalyst and fluidly isolated from one another within the catalytic heat exchanger and each arranged to exchange heat with the second flow path;
   the method comprising using a control valve to control flow to the each of the core flow paths to change capacity of the catalytic heat exchanger;
   wherein the plurality of core flow paths are arranged in parallel through the catalytic heat exchanger;
   wherein the catalytic heat exchanger comprises a plurality of distinct cores and each core defines one of the plurality of core flow paths of the first flow path;
   wherein each of the plurality of distinct cores has a different cooling capacity; and
   wherein a second core of the plurality of cores has twice the cooling capacity of a first core of the plurality of cores.

6. A method as claimed in claim 5, comprising preventing flow to a core flow path to reduce heat exchanger capacity.

7. A method as claimed in claim 5, comprising starting flow to a core flow path to increase heat exchanger capacity.

8. A method as claimed in claim 5, comprising preventing flow to a core flow path in response to a reduced demand for inert gas.

9. A method as claimed in claim 5, comprising starting flow to a core flow path in response to an increased demand for inert gas.

10. A method as claimed in claim 5, wherein the system includes a control valve arranged upstream of the first flow path of the catalytic heat exchanger, wherein controlling flow to the each of the core flow paths to change capacity of the catalytic heat exchanger includes operating the control valve.

* * * * *